(12) United States Patent
McDonald et al.

(10) Patent No.: US 10,257,740 B2
(45) Date of Patent: Apr. 9, 2019

(54) ASSIGNING PRIORITIES TO PORTABLE COMMUNICATION DEVICES BASED ON ROLES ASSOCIATED WITH AN INCIDENT PROFILE

(71) Applicant: MOTOROLA SOLUTIONS, INC., Chicago, IL (US)

(72) Inventors: Daniel J. McDonald, Cary, IL (US); Yunhai Yang, Elgin, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/621,303

(22) Filed: Jun. 13, 2017

(65) Prior Publication Data

US 2018/0359654 A1    Dec. 13, 2018

(51) Int. Cl.
| | |
|---|---|
| *H04W 4/08* | (2009.01) |
| *H04W 76/50* | (2018.01) |
| *H04W 28/02* | (2009.01) |
| *H04W 72/02* | (2009.01) |
| *H04W 72/12* | (2009.01) |
| *H04L 12/927* | (2013.01) |
| *H04L 12/911* | (2013.01) |
| *H04W 72/10* | (2009.01) |

(52) U.S. Cl.
CPC ......... *H04W 28/0215* (2013.01); *H04L 47/80* (2013.01); *H04W 4/08* (2013.01); *H04W 72/02* (2013.01); *H04W 72/1242* (2013.01); *H04W 76/50* (2018.02); *H04L 47/70* (2013.01); *H04L 47/803* (2013.01); *H04W 72/10* (2013.01)

(58) Field of Classification Search
CPC ..... H04W 48/16; H04W 48/18; H04W 76/50; H04W 8/186; H04W 4/10; H04W 4/08; H04W 4/06
USPC ................... 455/404.1, 416, 420, 453, 456.3
See application file for complete search history.

(56) References Cited

U.S. PATENT DOCUMENTS

| | | | |
|---|---|---|---|
| 6,564,066 B1 | 5/2003 | Biggs et al. | |
| 6,928,294 B2 | 8/2005 | Maggenti et al. | |
| (Continued) | | | |

OTHER PUBLICATIONS

Combined Search and Examination Report from the Intellectual Property Office of Great Britain for Application No. 1807784.2 dated Oct. 25, 2018 (3 pages).

*Primary Examiner* — Philip Sobutka
(74) *Attorney, Agent, or Firm* — Michael Best & Friedrich LLP (57) ABSTRACT

A method of assigning a priority to a portable communication device in a communication system. The method includes determining an incident profile. The incident profile defines an expected timeline having a first incident stage, a first role associated with the first incident stage, a second incident stage, and a second role associated with the second incident stage. The first role is different than the second role, and the incident profile indicates a desired priority rank for the first role and the second role. The method also includes assigning a priority rank to a first portable communication device when the first portable communication device corresponds to the first role during the first incident stage, detecting a transition between the first incident stage and the second incident stage, and assigning the priority rank of the portable communication device according to the second role during the second incident stage.

20 Claims, 5 Drawing Sheets

(56) References Cited

U.S. PATENT DOCUMENTS

| | | | |
|---|---|---|---|
| 8,634,799 B1 * | 1/2014 | Economy | H04W 48/18 455/404.1 |
| 2002/0077136 A1 | 6/2002 | Maggenti et al. | |
| 2003/0012143 A1 | 1/2003 | Chen et al. | |
| 2007/0232276 A1 | 10/2007 | Andersson | |
| 2007/0281723 A1 | 12/2007 | Chotai et al. | |
| 2010/0287281 A1 | 11/2010 | Tirpak | |
| 2014/0233472 A1 | 8/2014 | Kadel | |
| 2016/0219628 A1 | 7/2016 | Sharma et al. | |

* cited by examiner

ASSIGNING PRIORITIES TO PORTABLE COMMUNICATION DEVICES BASED ON ROLES ASSOCIATED WITH AN INCIDENT PROFILE

BACKGROUND OF THE INVENTION

Public service agencies address various types of incidents. In an attempt to ensure that different members of the public service agency can readily communicate with each other, a communication system is deployed and shared by the members of the public service agency. Typically, each member is provided with a portable communication device which is used to communicate with other members of the public service agency via the communication system. The communication system may, however, have limited communication resources. Different priority levels are, therefore, assigned to each portable communication device to properly allocate the communication resources among a particular group of members or across the public service agency. Generally, members or users of the communication system with lower priority levels have more limited access to the communication resources than those users with higher priority levels. These priority levels are statically assigned to various mobile devices based on, for example, the position of the user associated with the mobile device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

While assigning static priorities to particular portable communication devices helps to better allocate the communication resources within a communication system, these static priorities are not flexible to adapt to the many different situations often encountered by members of the public service agency. For example, the members of the public service agency (also referred to as users herein) may fulfill different roles based on the type of incident they are addressing, and may face different situations while responding to calls for service. In one example, the public service agency corresponds to a fire department in which hose operators generally have a lower priority than firefighters part of a break-in crew. The hose operator, however, may warrant better access to the communication resources when, for example, the hose is inoperable or the hose operator faces a similar difficult or unexpected situation. In other examples, other low priority users may temporarily warrant higher priority to communicate other unexpected situations. Yet, with statically assigned priorities, the hose operators may have to wait for available resources to communicate that there is a problem with the hose, while the break-in crew members enjoy a higher priority rank without a high need during that particular situation.

In some embodiments, the portable communication devices may be configured with an emergency call button that provides the portable communication device with a higher priority (in some instances, the emergency call button provides the user with the highest priority) within the communication system. Many members of the public service agency, however, reserve the use of the emergency button for life-threatening situations. Additionally, the emergency call button relies on the user of the portable communication device to determine that a higher priority is necessary. While attending an incident, however, the member of the public service agency (sometimes referred to as users herein) cannot reasonably discern whether their currently assigned priority is appropriate for their situation. Accordingly, the emergency call button also fails to provide the necessary flexibility to adequate allocate the communication resources among users of the communication system.

One embodiment provides a method of assigning a priority to a portable communication device in a communication system. The method includes determining, with an electronic processor, an incident profile defining an expected timeline. The expected timeline has a first incident stage, a first role associated with the first incident stage, a second incident stage, and a second role associated with the second incident stage. The first role is different than the second role, and the expected timeline indicates a desired priority rank for the first role and the second role. The method also includes assigning, with the electronic processor, a priority rank to the portable communication device when the portable communication device corresponds to the first role during the first incident stage, detecting, with the electronic processor, a transition between the first incident stage and the second incident stage, and assigning, with the electronic processor, the priority rank to the portable communication device based on the second role associated with the second incident stage in response to detecting the transition to the second incident stage.

Another embodiment provides a communication controller for a communication system. The communication controller includes an interface and an electronic processor coupled to the interface. The interface is configured to access an incident profile defining an expected timeline having a first incident stage, a first role associated with the first incident stage, a second incident stage, and a second role associated with the second incident stage. The first role is different than the second role, and the incident profile indicates a priority rank for the first role and the second role. The electronic processor is configured to assign a first priority rank to a portable communication device, the portable communication device corresponding to the first role, during the first incident stage, and detect a transition from the first incident stage to the second incident stage. The electronic processor is also configured to assign a second priority rank to the portable communication device based on the second role associated with the second incident stage, after the transition to the second incident stage, and prioritize a communication resource to the portable communication device when the portable communication device has a higher priority rank among other portable communication devices in the communication system.

Figure 1:
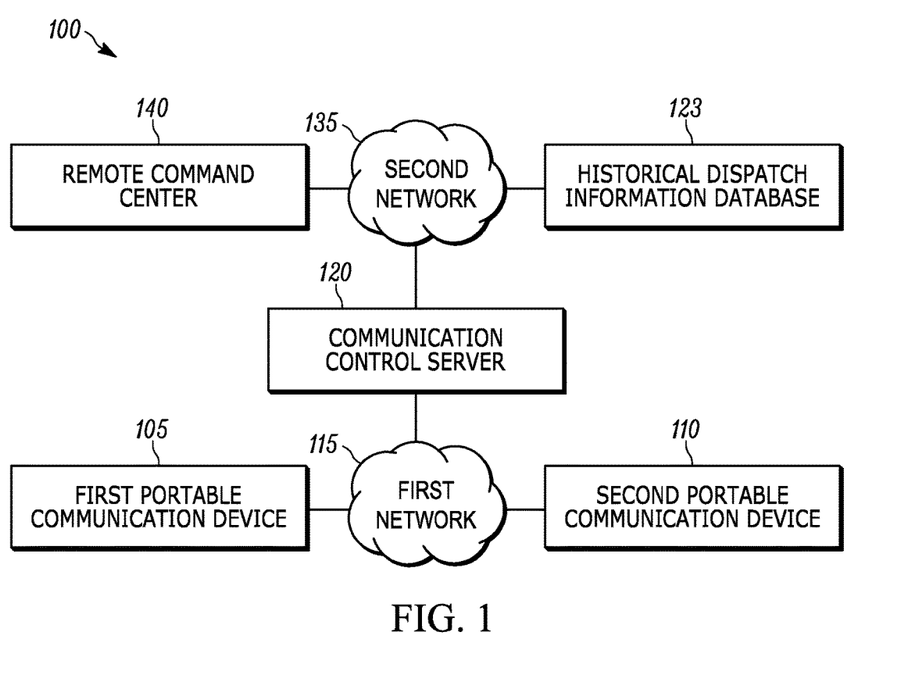
FIG. 1 is a diagram of a communication system in accordance with some embodiments.

FIG. 1 is a diagram of an example communication system 100 that allows various members of a public service agency to communicate with each other and that provides dynamically adapted priority ranks to the portable communication devices of the communication system 100. The public service agency may be, for example, a police department, a fire department, an emergency medical services department, and the like. As shown in FIG. 1, the communication system includes a first portable communication device 105 and a second portable communication device 110 that communicate over a first network 115. Typically, each portable communication device 105, 110 is associated with a specific user (that is, a member of the public service agency) and allows the user to communicate with other users over the first network 115. Each portable communication device 105, 110 may be, for example, a smartphone, a cellphone, a two-way radio, a tablet computer, a laptop computer, and in some embodiments, a desktop computer.

The communication system 100 also includes a communication control server 120. The communication control server 120 is in communication with the first portable communication device 105 and the second portable communication device 110 over the network 115. The communication control server 120 also accesses a historical dispatch information database 123 over a second network 135. In the illustrated embodiment, the communication control server 120 also communicates with a remote command center 140 that is outside the communication system 100. In some embodiments, the communication control server 120 communicates with the remote command center 140 over the second network 135. The remote command center 140 may be, for example, a center staffed by other members of the public service agency and may communicate commands to the communication control server 120 to change the priority ranks of the portable communication devices 105, 110. In some embodiments, the remote command center 140 may correspond to, for example, the main office or headquarters for the public service agency. In some embodiments, the communication system 100 may include more or less components than those explicitly described herein.

The first and second networks 115, 135 may include wired networks, wireless networks, or combinations of the same and may be implemented using a wide area network, such as the Internet or cellular long-term evolution (LTE) network, a local area network, such as a Wi-Fi network, or combinations or derivatives thereof. It should be understood that the portable communication devices 105, 110, the control server 120, and the database 123 may communicate over more than the communication networks illustrated in FIG. 1 and different pairs of components may communicate over different networks. Also, in some embodiments, the control server 120 may communicate with the database 123 over a dedicated connection rather than a communication network.

The dispatch information database 123 stores historical dispatch information. Historical dispatch information refers to information regarding previous incidents resolved by the public service agency, and may include information such as, for example, the incident type, the expected travel time to the site of the incident, the distance to the incident site, the neighborhood surrounding the incident site (also referred to as the geographic region of the incident site), traffic conditions encountered while traveling to the incident site, weather condition during the incident (for example, precipitation, wind conditions, humidity levels, and the like), the members of the public service agency who participated in the response, specific buildings and/or type of buildings involved in the incident, types and/or number of entries into the building or incident site, severity of incident, scale of incident (for example, how many people were affected by the incident), whether medical assistance was required or provided, what type of medical assistance was provided (for example, how severe the injuries were, what type of injuries were encountered, whether transportation to a nearby medical facility was provided, and the like), the source of the incident (for example, where a fire may have started), number of witnesses of the incident, surveillance equipment availability (for example, if any cameras recorded the incident), equipment used to address the incident (for example, gas masks, carbon monoxide meters, hoses, fire blankets, and the like). The dispatch information database 123 may include more or less information regarding the incidents resolved by the public service agency.

The dispatch information database 123 may also store information regarding the role of each member of the public service agency during the incident. For example, the dispatch information database 123 may store information such as different stages of addressing the incident, the role assigned to each member of the public service agency, the level of participation of each member during different stages of the incident, messages exchanged between members responding to the incident (for example, exchanged radio messages and/or text messages), and the like.

The control server 120 assigns priorities to the portable communication devices 105, 115 to dynamically allocate the resources of the communication system based on historical dispatch information, for example, accessed from the database 123. In the example shown in FIG. 2, the control server 120 includes an electronic processor 200 (for example, a microprocessor, application-specific integrated circuit (ASIC), or another suitable electronic device), a storage device 205 (for example, a non-transitory, computer-readable storage medium), a first communication interface 210 to communicate with the first network 115, and a second communication interface 215 to communicate with the second network 135. It should be understood that the control server 120 may include additional components than those illustrated in FIG. 2 in various configurations and may perform additional functionality than the functionality described in the present application.

Figure 2:
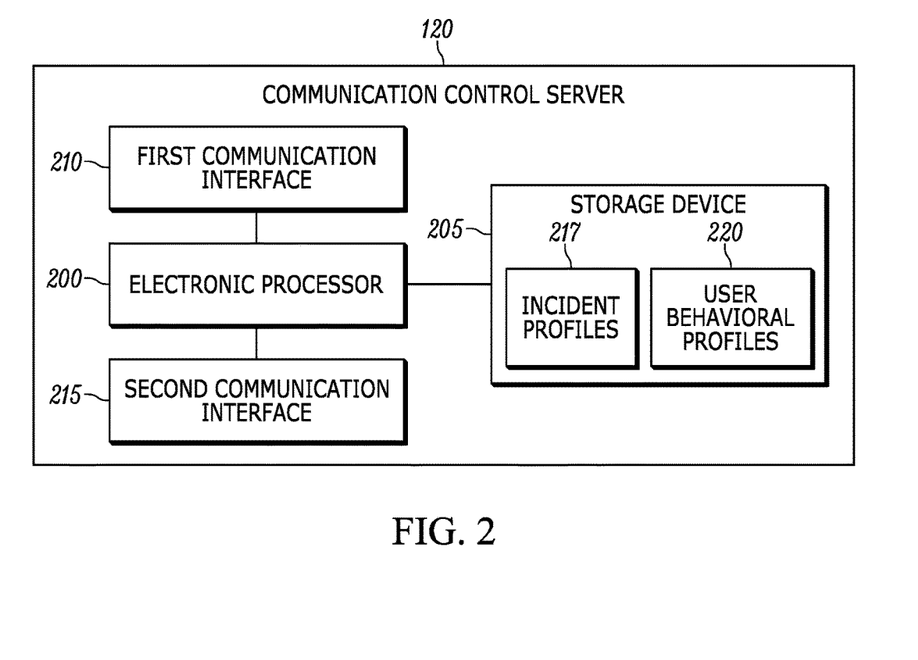
FIG. 2 is a diagram of a communication control server of the communication system of FIG. 1.

The electronic processor 200, the storage device 205, the first communication interface 210, and the second communication interface 215 communicate over one or more wired communication lines or buses or wirelessly. The storage device 205 includes read-only memory (ROM), random-access memory (RAM), other non-transitory computer-readable media, or a combination thereof. For example, the storage device 205 stores non-transitory computer readable instructions to be retrieved and executed by the electronic processor 200 to identify and assign different priority settings to each portable communication device 105, 110. As discussed in more detail below, the storage device 205 also stores a plurality of incident profiles 217 and a plurality of user behavioral profiles 220.

Figure 3:
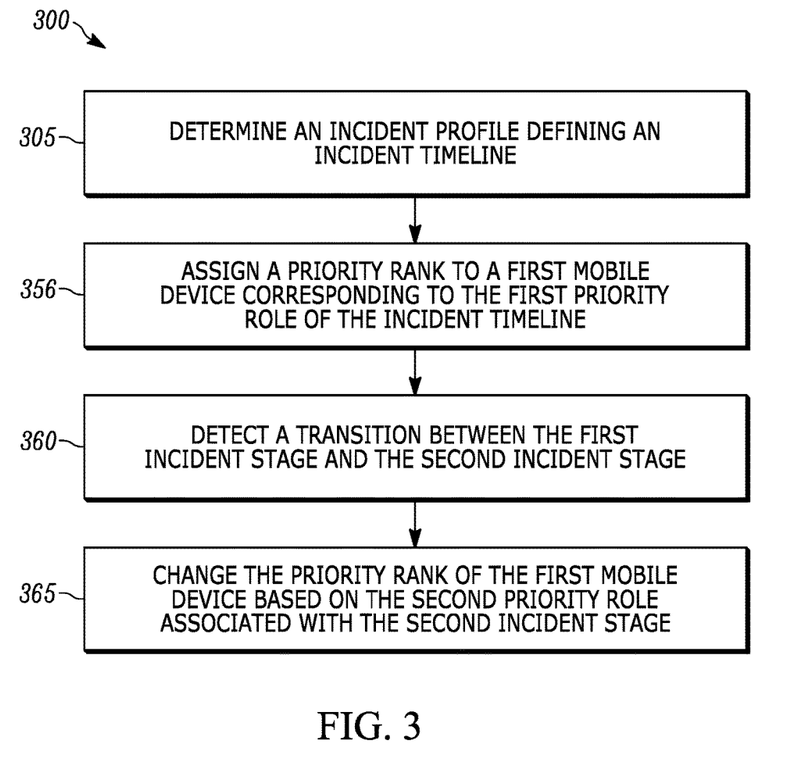
FIG. 3 is a flowchart illustrating a method of assigning adaptive priorities to users of the communication system of FIG. 1 according to some embodiments.

FIG. 3 illustrates a method 300 of assigning priority ranks to the portable communication devices 105, 110 based on the roles for the users of the portable communication devices 105, 110 and the historical dispatch information. As shown in FIG. 3, the electronic processor 200 determines an incident profile for the incident to be resolved (block 305). In the illustrated embodiment, the electronic processor 200 determines the incident profile based on the dispatch information received from the dispatch information database 123 and based on the incident type of the current incident. For example, when the members of the public service agency receive a call for service, the electronic processor 200 determines the incident type associated with the call for service and determines an incident profile based on the incident type.

Figure 4:
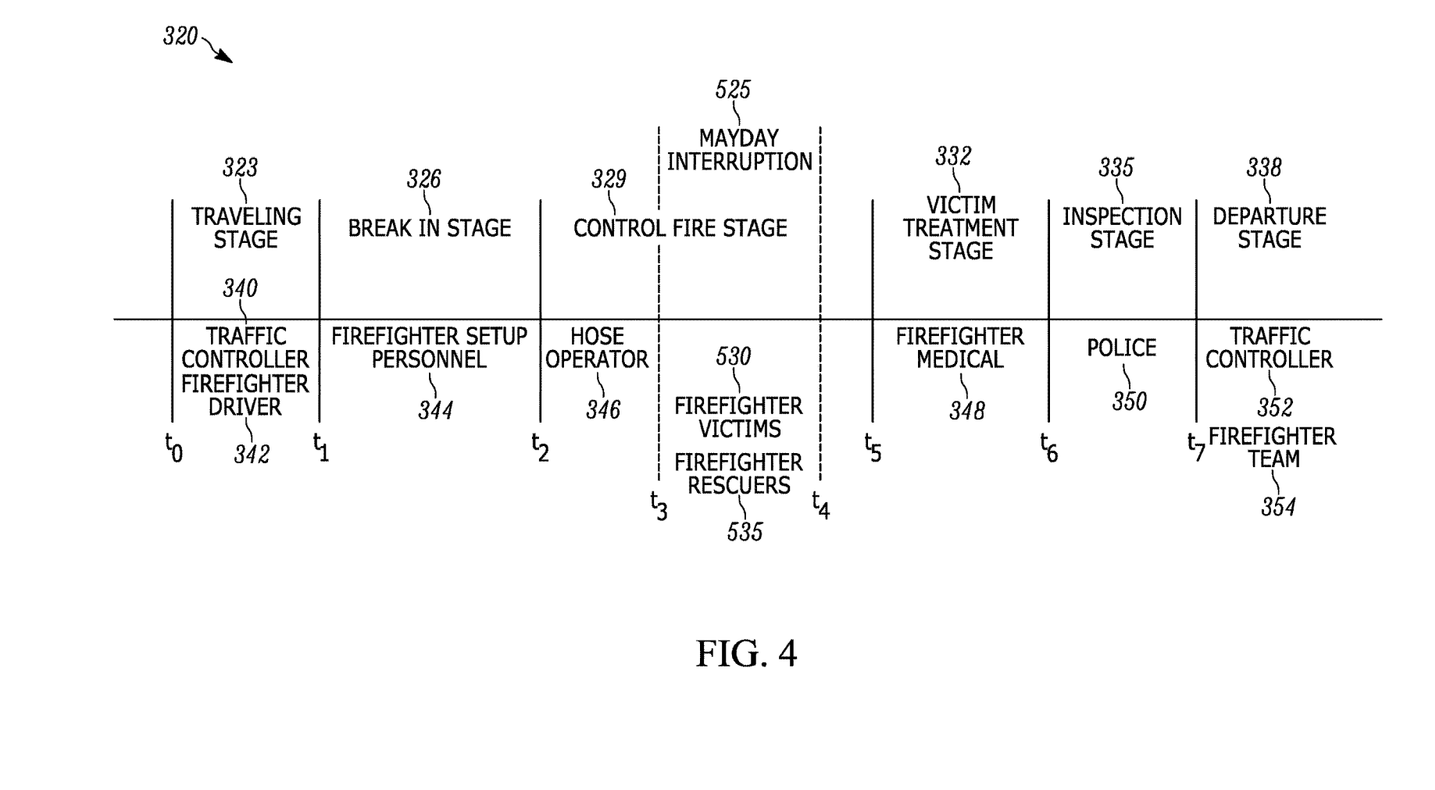
FIG. 4 illustrates an exemplary incident timeline.

The incident profile defines an incident timeline to aid the electronic processor 200 to change the priority ranks of the portable communication devices 105, 110. FIG. 4 illustrates an exemplary incident timeline 320. As shown in FIG. 4, the incident timeline 320 includes a plurality of incident stages 323, 326, 329, 332, 335, 338. The incident stages 323, 326, 329, 332, 335, 338 represent the development of an incident while the members of the public service agency resolve the incident. In the example illustrated, incident timeline 320 represents the timeline for addressing a fire incident, and includes six different incident stages that allow the users to address the fire incident. In the illustrated embodiment, the incident stages include a traveling stage 323 during which the users (e.g., the responders from the public service agency) travel to the incident site, a break-in stage 326 during which the users enter the premise at the incident site, a control fire stage 329 during which the users control the fire at the incident site, a victim treatment stage 332 during which the users provide assistance to victims at the incident site, an inspection stage 335 during which the users inspect the incident site to gain information regarding the source and start of the incident, and a departure stage 338 during which the users leave the incident site. The incident timeline 320 of FIG. 5 also illustrates an abnormal situation 515 detected by the electronic processor 200 and discussed in further detail below. Each incident timeline, however, includes a different number of incident stages, and the incident stages may be different than those illustrated in FIG. 4.

Each incident stage is associated with a high priority role (for example, high priority roles 340, 342, 344, 346, 348, 350, 352, 354) and a desired priority rank for the high priority role based on which roles are expected to warrant higher priority access to the communication resources during each particular incident stage. In some embodiments, the desired priority rank may be implied for the high priority role. For example, in some embodiments the incident stage may be associated with a single high priority role indicating that the highest priority rank is desired. In other embodiments, the incident profile may explicitly specify the desired priority rank for the high priority role (and/or other roles).

For example, the traveling stage 323 is associated with two high priority roles: a traffic controller 340 and a firefighter driver 342. The traffic controller and/or the firefighter driver are expected to be the most probable users to encounter an unexpected or abnormal situation and warrant more immediate access to the communication resources during the traveling stage 323. As shown in FIG. 4, the high priority role for each incident stage may be different. In some embodiments, however, a portable communication device 105, 110 may be associated with more than a single role during the response to the incident stage. For example, with respect to the illustrated embodiment, in some instances the portable communication device 105, 110 associated with the firefighter driver role 342 may also be associated with the hose operator role 346. In some embodiments, the roles associated with each portable communication device 105, 110 change during each incident response. In such instances, the electronic processor 200 determines the role associated with each portable communication device 105, 110 based on a user input, keyword detection, and/or a lookup table.

Additionally, each incident stage 323, 326, 329, 332, 335, 338 is associated with a predetermined period (or duration) that specifies the expected duration of the incident stage based on the dispatch information from the historical dispatch information database 123. With reference to the embodiment illustrated in FIG. 4, the traveling stage 323 is associated with a first predetermined period from $t_0$ to $t_1$, the break in stage 326 is associated with a second predetermined period from $t_1$ to $t_2$, the control fire stage 329 is associated with a third predetermined period from $t_2$ to $t_3$. Similarly, the victim treatment stage 332 is associated with a fourth predetermined period from $t_3$ to $t_4$. The inspection stage 335 is associated with a fifth predetermined period from $t_4$ to $t_5$, and the departure stage 338 is associated with a sixth predetermined period from $t_5$ to $t_6$. Each predetermined period may be a different duration specifically determined for the particular incident stage, for example, based on the historical dispatch information. In embodiments in which the incident timeline includes more or less stages, the predetermined periods for each of the stages may be longer or shorter than the ones illustrated in FIG. 4.

Referring back to FIG. 3, the electronic processor 200 assigns a high priority rank to the first portable communication device 105 when the first portable communication device 105 corresponds to the high priority role associated with a first incident stage (for example, the traveling stage 323) at block 356. In the example of FIG. 4, the electronic processor 200 assigns a higher priority rank to the first portable communication device 105 when the first portable communication device 105 is associated with the traffic controller and/or the firefighter driver role. In some embodiments, each incident stage includes a list ranking different roles in terms of priority levels. For example, an incident stage may include a list ranking the top priority role and the second priority role. Notably, the list may not include all the roles associated with a particular incident stage as some of the roles may not be expected to become high priority. In such embodiments, the electronic processor 200 assigns the priority ranks to the portable communication devices 105, 110 of the communication system 100 according to the list associated with the current incident stage. For example, the list may specify that the traffic controller and the firefighter roles are high priority roles, while the hose operators are medium priority roles, and the medical firefighters are low priority roles during the traveling stage 323. In other embodiments, however, the incident timeline 320 only specifies the high priority roles associated with each incident stage 323, 326, 329, 332, 335, 338.

After assigning the high priority rank to the first portable communication device 105 during the first incident stage, the electronic processor 200 detects a transition between the first incident stage and the second incident stage (block 360). For example, the electronic processor 200 detects a transition between the traveling stage 323 and the break-in stage 326. The electronic processor 200 may detect the transition between different incident stages based on, for example, determining that the predetermined period of time associated with the first incident stage (for example, the traveling stage 323) has elapsed, detecting a transition message transmitted among the portable communication devices 105, 110, receiving a message from the remote command center 140, and/or a combination thereof. For example, the electronic processor 200 detects the transition between the first incident stage 323 and the second incident stage 326 when the first predetermined period from $t_0$ to $t_1$ elapses. Analogously, the electronic processor 200 detects the transition between the second incident stage 326 and the third incident stage 329 when the second predetermined period from $t_1$ to $t_2$ elapses.

In some embodiments, the electronic processor 200 also monitors messages transmitted among the portable communication device 105, 110 and detects the transition between two incident stages by detecting transition messages exchanged by the portable communication devices 105, 110. The portable communication devices 105, 110 may exchange text messages and/or voice messages over the network 115. Accordingly, the transition messages may include text messages, voice messages, or a combination thereof The transition messages indicate the end of a particular incident stage and/or the beginning of a particular incident stage. For example, a transition message indicating the end of the traveling stage 323 may include a voice message from the firefighter driver of "we have arrived at the incident site," or a message with similar content. In some embodiments, the electronic processor 200 detects specific keywords in the messages transmitted among the portable communication devices 105, 110 and determines whether the messages constitute a transition message. For example, the electronic processor 200 may detect keywords such as arrived, ETA (estimated time of arrival), going in, found, victim, close, and the like. In one example, the electronic processor 200 determines that a message such as "going in now" may indicate the beginning of the break in stage 326 shown in FIG. 4. The electronic processor 200 may detect different keywords based on the incident timeline 320. For example, the incident timeline 320 may also include a list of keywords associated with each stage transition. Because different incident timelines include different incident stages, each incident timeline may be associated with a different set of keywords that indicate transitions in the incident stages. By monitoring the communication among the portable communication devices 105, 110, and detecting the transition of incident stages based on keywords from the different messages, the electronic processor 200 can more adequately and precisely determine the priority of the portable communication devices 105, 110 and can more efficiently allocate the resources of the communication system 100.

After the electronic processor 200 detects the transition between incident stages, the electronic processor 200 changes the priority rank of the first portable communication device 105 based on the second priority role associated with the second incident stage (block 365). With reference to the example of FIG. 4, the electronic processor 200 changes the priority of the first portable communication device 105 in response to detecting the transition between the traveling stage 323 and the break in stage 326. In particular, the electronic processor 200 decreases the priority rank of the first portable communication device 105 associated with the firefighter driver role because the break in stage 326 is associated with the second high priority role of firefighter setup personnel, not the firefighter driver role. Accordingly, the priority rank of the first portable communication device 105 decreases, but when, for example, the second portable communication device 110 is associated with the firefighter setup personnel role, the priority rank of the second portable communication device 110 increases in response to the electronic processor 200 detecting the start of the break-in stage 326.

Although the detection of transition between incident stages and the change of priority rank for a portable communication device 105, 110 has been discussed with respect to the traveling stage 323 (for example, the first incident stage) and the break in stage 326 (for example, the second incident stage), the electronic processor 200 continues to detect the transition between the different incident stages (that is, between the second incident stage and the third incident stage, between the third incident stage and the fourth incident stage, and the like) of the incident timeline 320, and changes the priority rank of the portable communication devices 105, 110 according to the high priority roles associated with each incident stage. The electronic processor 200 thereby provides dynamically assigned priority ranks to the portable communication devices 105, 110 based on the roles associated with the portable communication devices 105, 110 (for example, whether the portable communication device 105 is associated with a firefighter driver role), and the current incident stage.

Figure 5:
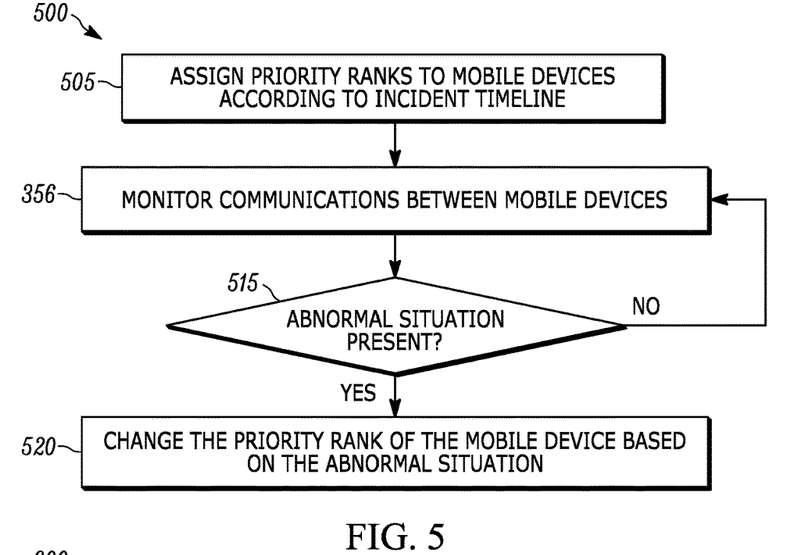
FIG. 5 is a flowchart illustrating a method of adapting priority ranks based on abnormal situations.

Although the incident timeline 320 provides an adequate basis for the electronic processor 200 to dynamically change the priority rank of the portable communication devices 105, 110 according to the development of the incident, the electronic processor 200 also adapts the priority rank of the portable communication devices 105, 110 when unexpected and/or abnormal situations arise. FIG. 5 illustrates a method 500 of adapting the priority rank of the portable communication devices 105, 110 based on unexpected and/or abnormal situations. As shown in FIG. 5, the electronic processor 200 defaults to assigning the priority ranks to the portable communication devices 105, 110 according to the incident timeline 320 (block 505). The electronic processor 200 monitors the communications between the portable communication devices 105, 110 (block 510), and determines whether an abnormal situation is present (block 515). When the electronic processor 200 determines that no abnormal situation is present, the electronic processor 200 continues to assign the priority ranks to the portable communication devices 105, 110 based on the incident timeline 320 (block 505)

When, on the other hand, the electronic processor 200 determines that an abnormal situation is present, the electronic processor 200 interrupts following the incident timeline 320 and changes the priority of the portable communication devices 105, 110 based on the abnormal situation (block 520). The electronic processor 200 may return to following the incident timeline 320 after determining that the abnormal situation is resolved. The electronic processor 200 detects abnormal situations by detecting abnormal conditions in the transmissions between the portable communication devices 105, 110. In some embodiments, the electronic processor 200 accesses the user behavioral profiles 220 and compares the current communications to the user behavioral profiles 220. The electronic processor 200 then determines that an abnormal situation is present when the transmissions between portable communication devices 105, 110 deviate significantly from the user behavioral profiles 220. In other words, the electronic processor 200 detects that an abnormal situation is present when unusual user behavior is detected.

For example, the electronic processor 200 may determine that an abnormal situation is present when the transmission rates from a particular portable communication device 105, 110 change significantly. The electronic processor 200 may expect, based on, for example, the user behavioral profiles, a particular transmission rate from the first portable communication device 105 based on the role associated with the first portable communication device 105 and the type of incident. The electronic processor 200, however, detects an abnormal condition when the transmission rate for the first portable communication device 105 exceeds the expected transmission rates by a transmission threshold (for example, three times higher or lower than the expected transmission rates). The first portable communication device 105 (that is, the user associated with the first portable communication device) may have an increased transmission rate because, for example, the user may be trying to communicate an emergency situation to the remainder of the response team. In other embodiments, the electronic processor 200 may detect an abnormal condition based on other characteristics of the transmissions of the portable communication devices 105, 110, such as, for example, the transmission power from each portable communication device 105, 110 because an abnormal situation may cause the transmission power from a portable communication device 105, 110 to decrease.

In some embodiments, the electronic processor 200 also detects an abnormal condition when a portable communication device 105, 110 transmits an emergency message or transmission. The emergency message may be transmitted by the portable communication device 105 by, for example, pressing an emergency button while transmitting a message. In some embodiments, the portable communication devices 105, 110 include a button or different type of actuator that enables the portable communication device 105, 110 to indicate that an emergency message is being transmitted. The electronic processor 200 detects the emergency message and determines that an abnormal condition (for example, a mayday situation 525) is present. FIG. 4 illustrates an example of an abnormal condition detected by the electronic processor 200 represented by the mayday interruption 515. In the illustrated example, the second portable communication device 110 associated with, for example, the firefighter victim, transmits an emergency message. As shown in FIG. 4, the mayday interruption 525 is not typically part of the incident timeline 320 (that is, the mayday interruption 525 does not correspond to one of the incident stages defined by the incident timeline) and includes different high priority roles than those associated with the incident stages. While FIG. 4 illustrates the mayday interruption 515 occurring during the control fire stage 329, in other embodiments, the abnormal situation may occur during a different incident stage.

As mentioned above, once the electronic processor 200 detects an abnormal situation, the electronic processor 200 changes the priority ranks of the portable communication devices 105, 110 based on the abnormal situation. For example, when the electronic processor 200 detects the emergency message from the second portable communication device 110, the electronic processor 200 increases the priority rank of the second portable communication device 110. Analogously, when the electronic processor 200 detects the increased transmission rates from the first portable communication device 105, the electronic processor 200 increases the priority rank of the first portable communication device 105. As shown in FIG. 4, the abnormal situation (for example, the mayday interruption 525) may also be associated with high priority roles (for example, the firefighter victims 530 and the firefighter rescuers 535). In such instances, the electronic processor 200 increases the priority rank of the portable communication devices 105, 110 associated with the high priority roles specified by the specific abnormal situation.

In some embodiments, the electronic processor 200 maintains the priority rank of the portable communication devices (for example, the second portable communication device 110) associated with the abnormal situation until the abnormal situation is resolved. The electronic processor 200 may detect that an abnormal situation is resolved based on, for example, detecting that the communication conditions (for example, the transmission rates) between the portable communication devices 105, 110 have returned to normal. In other embodiments, the electronic processor 200 may detect that the abnormal situation is resolved by detecting a transition to another incident stage as discussed above with respect to block 360. For example, the electronic processor 200 determines that an abnormal situation is resolved by detecting keywords, or referring back to the incident timeline 320.

In some embodiments, the electronic processor 200 also receives a command from the remote command center 140 to change the priority ranks of the portable communication devices 105, 110. The remote command center 140 may send instructions to the electronic processor 200 to increase or decrease the priority rank for at least one of the portable communication devices 105, 110. The electronic processor 200, upon receiving the instructions from the remote command center 140, changes the priority ranks of the portable communication devices 105, 110 according to the instructions received from the remote command center 140. In one embodiment, the electronic processor 200 receives a command from an external device (for example, the remote command center 140) outside the communication system 100 to change the priority rank of the portable communication devices 105, 110 and changes the priority rank of the portable communication devices 105, 110 according to the command.

Figure 6:
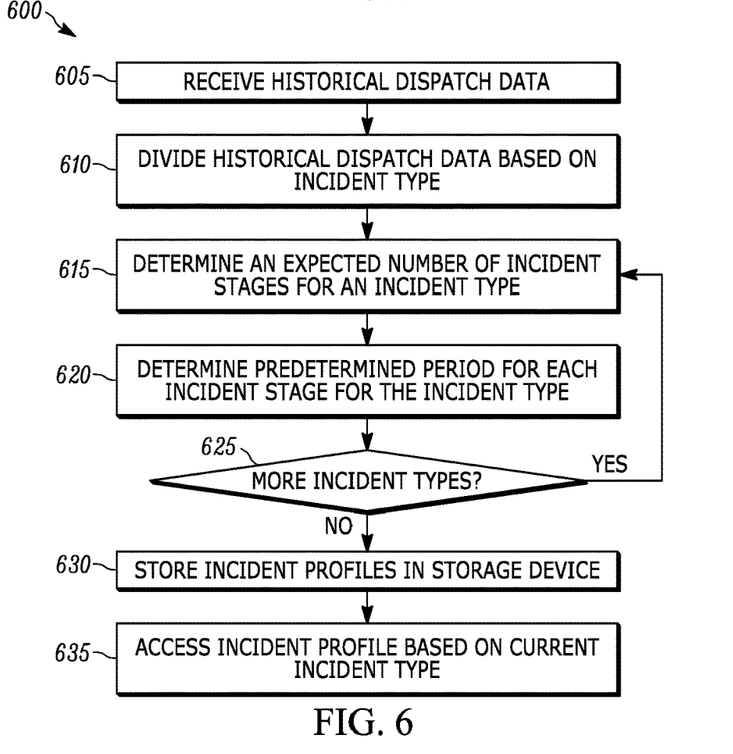
FIG. 6 is a flowchart illustrating a method of determining the incident timeline.

FIG. 6 illustrates a method 600 of generating an incident profile. As shown in FIG. 6, the electronic processor 200 first receives historical dispatch data from the dispatch information database 123 (block 605). The electronic processor 200 then divides the historical dispatch information by incident type (block 610). In other words, the electronic processor 200 groups together the dispatch data corresponding to the same incident type. For example, if the public service agency responds to three different types of incidents such as, for example, a fire incident, a medical emergency incident, and a vehicle collision incident, the historical dispatch data is divided into three groups in which each group corresponds to a different type of incident.

The electronic processor 200 then determines an expected number of incident stages and the nature of the incident stages based on the incident type and the historical dispatch information (block 615). Since responding to each incident type typically requires different actions by different people (that is, by different users or members of the public service agency), the incident timeline includes a different number of incident stages based specifically on the incident type. For example, the incident timeline 320 of FIG. 4 corresponds to a fire incident, which typically (that is, based on the historical dispatch data) includes six different incident stages (that is, incident stages 323, 326, 329, 332, 335, 338). When the incident type, however, is a medical emergency, the incident timeline may include fewer incident stages such as, for example, a traveling stage, a victim treatment stage, an inspection stage, and a departure stage. Accordingly, the incident timeline includes different incident stages based on the incident type. The electronic processor 200 determines the number and the nature of the incident stages based on the historical dispatch data for the different incident types.

Additionally, the electronic processor 200 determines the predetermined period associated with each of the incident stages based on the historical dispatch information (block 620). In particular, the electronic processor 200 determines the predetermined period for each incident stage based on different parameters that may affect the specific incident stage. In other words, the electronic processor 200 determines the parameters that are most probable to affect the duration of each incident stage, and determines the predetermined period of each incident stage based on those parameters. With reference to the exemplary incident timeline 320 of FIG. 4, the electronic processor 200 determines the first predetermined period associated with the traveling stage 323 based on, for example, an estimated travel time to the incident site. The electronic processor 200 estimates the travel time based on, for example, the distance to the incident site, the neighborhood of the incident site, traffic encountered while traveling to the incident site, and weather conditions encountered while traveling to the incident site.

The electronic processor 200 then determines the second predetermined period associated with the break-in stage 326 based on different parameters than those used to determine the first predetermined period. Specifically, the electronic processor 200 determines the duration of the second predetermined period based on, for example, a type of building associated with the incident, a number of entries into the building, the type of entries into the building, and the like. In the illustrated example, the electronic processor 200 determines the third predetermined period based on, for example, a type of fire, a scale of the fire (for example, how much the fire has spread and/or the possibility of the fire spreading), the wind conditions at the incident site, and the like. The electronic processor 200 determines the fourth predetermined period based on, for example, a type of burn suffered by a victim, the degree of the burn(s) suffered by the victim, and/or whether the victim was provided with medical transportation to a nearby medical facility. The electronic processor 200 also determines the fifth predetermined period based on, for example, the source of the fire, the number of witnesses available, and whether any surveillance data was collected. Finally, the electronic processor 200 determines the sixth predetermined period based on, for example, the equipment that was utilized to respond to the incident and that may need to be stored after the incident is resolved.

Since a different incident timeline is generated for each type of incident, the electronic processor 200 then determines whether the historical dispatch data is to be analyzed for more incident types (block 625). When the electronic processor 200 determines that the incident profiles have been created for all the incident types of the historical dispatch data, the electronic processor 200 proceeds to store the incident profile in the storage device 205 (block 630). On the other hand, when the electronic processor 200 determines that more incident profiles are to be created for different incident types, the electronic processor 200 returns to block 615 to determine the number of incident stages and the predetermined period for each incident stage for a different incident type. As discussed above with respect to FIG. 3, when a new incident occurs and the public service agency begins to respond to it, the electronic processor 200 accesses the storage device 205 and retrieves an incident profile based on the type of the current incident (block 635). The electronic processor 200 then dynamically assigns the priority ranks of the portable communication devices 105, 110 according to the accessed incident timeline, as described above with reference to FIG. 3.

In some embodiments, the electronic processor 200 may repeat the method 600 of FIG. 6 periodically to update the incident profiles based on newly acquired historical dispatch data. For example, the electronic processor 200 may generate new incident profiles every three months to use the most recent historical dispatch data, and may update the incident profiles stored in the storage device 205.

Figure 7:
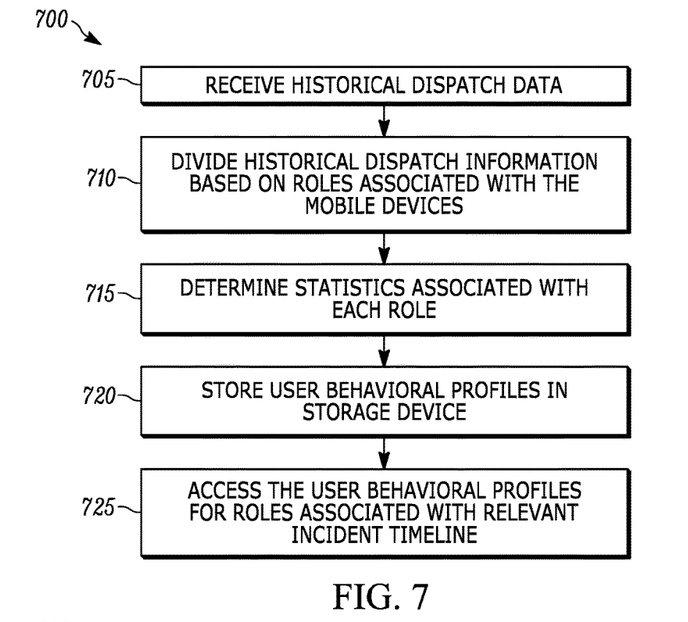
FIG. 7 is a flowchart illustrating a method of determining a user behavioral profile.

FIG. 7 illustrates a method 700 of accessing a user behavior profile based on the historical dispatch information. In some embodiments, the electronic processor 200 generates user behavior profiles to provide a baseline for detecting keywords and/or abnormal communication conditions of the portable communication devices 105, 110. As shown in FIG. 7, the electronic processor 200 receives information from the historical dispatch information database 123 (block 705). The received information includes, for example, messages exchanged by the portable communication devices 105, 110, exchange rates for portable communication devices 105, 110 associated with particular roles during various incident responses, and the like. The electronic processor 200 then divides the received information by particular roles associated with the relevant portable communication devices 105, 110 (block 710). For example, the electronic processor 200 divides the historical dispatch information based on the information related to portable communication devices associated with the firefighter driver role, the hose operator role, and the medical firefighter role separately. The electronic processor 200 then determines specific statistics associated with each role associated with the portable communication devices 105, 110 based on the historical dispatch information (block 715). The statistics may include, for example, expected transmission rates for a portable communication device 105, 110 associated with a specific role (for example, expected transmission rates for a portable communication device 105, 110 associated with a hose operator). In some embodiments, the statistics may also be divided by the incident stage, for example, indicating the expected transmission rate for a hose operator during the break-in stage. The statistics may range from expected transmission rates, specific messages typically transmitted, times with higher or lower expected transmission rates, and the like. The electronic processor 200 then stores the statistics for the portable communication devices 105, 110 associated with specific roles as a user behavioral profile in the storage device 205 (block 720). When the electronic processor 200 accesses an incident profile, the electronic processor 200 may then also access the user behavioral profiles for the roles associated with the incident profile (block 725).

Figure 8:
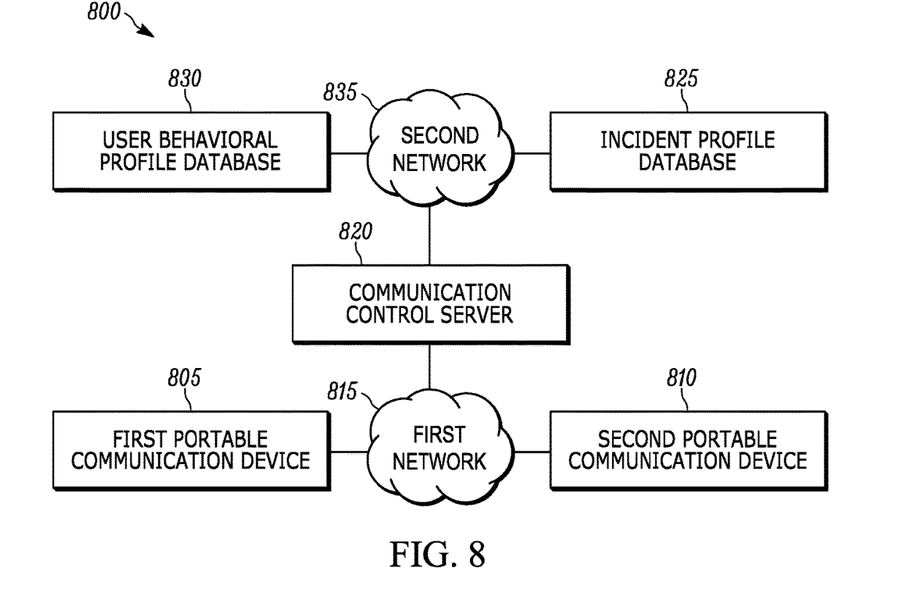
FIG. 8 is a diagram of another communication system in accordance with some embodiments.

As described above with respect to the incident profiles, in some embodiments, the electronic processor 200 repeats method 700 of generating the user behavioral profiles periodically to update the profiles with the most recently obtained historical dispatch information. Additionally, although the incident profiles and the user behavioral profiles have been described as being generated by the electronic processor 200, in some embodiments, a separate electronic processor within or outside of the communication system 100 generates the incident profiles and the user behavioral profiles. In such embodiments, the electronic processor 200 receives the incident profiles and the user behavioral profiles from databases. FIG. 8 illustrates an exemplary communication system 800 in which the electronic processor 200 does not generate the incident profiles and/or the user behavioral profiles. The communication system 800 of FIG. 8 includes similar components to the communication system 100 of FIG. 1, and similar components have been given similar reference numbers plus 700, and descriptions of such components are omitted for the sake of conciseness.

As shown in FIG. 8, the communication control server 820 communicates with an incident profile database 825 and with a user behavioral profile database 830 over the second network 835. The communication control server 820 receives the incident profiles from the incident profile database 825, and the user behavioral profiles from the user behavioral profile database 830. The communication control server 820 then uses the incident profile and the user behavioral profile to dynamically assign priority ranks to the portable communication devices 805, 810 and communicate with the portable communication devices 805, 810 over the first network 815. In some embodiments, the incident profile defines the incident timeline described above, but also includes the user behavioral profiles for the roles associated with the incident type of the incident profile. In such embodiments, the communication control server 820 may only communicate with the incident profile database 825 to obtain the incident profile for the desired incident.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of assigning priorities to a portable communication device in a communication system across different stages of an incident, the method comprising:
   accessing, with an electronic processor, an incident profile defining an expected timeline of an incident, the expected timeline specifying a first incident stage of the incident, a first responder role associated with the first incident stage, a second incident stage of the incident, and a second responder role associated with the second incident stage, the first responder role being different than the second responder role, and the incident profile indicating a desired priority rank for the first and second responder roles;

assigning, with the electronic processor, a priority rank to the portable communication device when the portable communication device corresponds to the first responder role during the first incident stage;

detecting, with the electronic processor, a transition between the first incident stage and the second incident stage; and assigning, with the electronic processor, the priority rank to the portable communication device based on the second responder role associated with the second incident stage in response to detecting the transition to the second incident stage.

2. The method of claim 1, wherein assigning the priority rank of the portable communication device based on the second responder role includes decreasing, with the electronic processor, the priority rank to the portable communication device when the portable communication device does not correspond to the second responder role.

3. The method of claim 1, further comprising, in response to detecting the transition to the second incident stage, increasing, with the electronic processor, a second priority rank of a second portable communication device when the second portable communication device corresponds to the second responder role.

4. The method of claim 1, wherein the portable communication device is a first portable communication device, wherein the expected timeline includes a third responder role associated with the first incident stage, a first priority rank associated with the first responder role, and a second priority rank associated with the third responder role, the first priority rank being different than the second priority rank, wherein assigning the priority rank to the portable communication device includes assigning the first priority rank to the first portable communication device, and further comprising assigning, with the electronic processor, the second priority rank to a second portable communication device during the first incident stage.

5. The method of claim 1, wherein detecting the transition between the first incident stage and the second incident stage includes determining that a duration of the first incident stage has elapsed.

6. The method of claim 5, further comprising determining the duration of the first incident stage by estimating an expected travel time for traveling to an incident site based on one selected from a group consisting of a travel distance, traffic conditions, weather conditions, and a geographic region of the incident site.

7. The method of claim 1, wherein detecting the transition between the first incident stage and the second incident stage includes detecting a transition message exchanged with the portable communication device.

8. The method of claim 1, wherein the portable communication device is a first portable communication device, and further comprising changing, with the electronic processor, the priority rank of the first portable communication device in response to receiving an emergency transmission from a second portable communication device during the first incident stage.

9. The method of claim 1, wherein the portable communication device is a first portable communication device, and further comprising changing the priority rank of the first portable communication device in response to detecting an abnormal situation with respect to a second portable communication device.

10. The method of claim 9, wherein detecting the abnormal situation includes detecting an increased transmission rate from the second portable communication device.

11. The method of claim 1, further comprising:
receiving, with the electronic processor, historical dispatch data;
generating, based on the historical dispatch data, a plurality of incident profiles; and
storing the plurality of incident profiles.

12. The communication controller of claim 1, wherein the electronic processor is configured to prioritize the communication resources to the portable communication device when the portable communication device has a higher priority rank among other portable communication devices in the communication system.

13. A communication controller for assigning priorities to a portable communication device in a communication system across different stages of an incident, the communication controller comprising:
an interface configured to access an incident profile defining an expected timeline of an incident, the expected timeline specifying a first incident stage of the incident, a first responder role associated with the first incident stage, a second incident stage of the incident, and a second responder role associated with the second incident stage of the incident, the first responder role being different than the second responder role, and the incident profile indicating different priority ranks for the first responder role and the second responder role; and
an electronic processor coupled to the interface, and configured to
assign a first priority rank to a portable communication device, the portable communication device corresponding to the first responder role, during the first incident stage, and
detect a transition from the first incident stage to the second incident stage,
assign a second priority rank to the portable communication device based on the second responder role associated with the second incident stage, after the transition to the second incident stage.

14. The communication controller of claim 13, wherein the second priority rank is lower than the first priority rank when the portable communication device does not correspond to the second responder role.

15. The communication controller of claim 14, wherein the portable communication device is a first portable communication device, wherein the electronic processor is configured to assign a third priority rank to a second portable communication device during the second incident stage when the second portable communication device corresponds to the second responder role, the third priority rank being higher than the second priority rank.

16. The communication controller of claim 13, wherein the expected timeline includes a third responder role associated with the first incident stage, the first priority rank associated with the first responder role, and a third priority rank associated with the third responder role, the first priority rank being higher than the third priority rank.

17. The communication controller of claim 13, wherein the electronic processor is configured to determine whether a predetermined duration associated with the first incident stage has elapsed, and detect the transition to the second incident stage when the predetermined duration elapses.

18. The communication controller of claim 13, wherein the electronic processor is configured to detect a transition message in the communication resource, and wherein the electronic processor detects the transition from the first incident stage to the second incident stage in response to detecting the transition message.

19. The communication controller of claim 13, wherein the portable communication device is a first portable communication device, and wherein the electronic processor is configured to change the first priority rank of the first portable communication device in response to detecting an abnormal situation with respect to a second portable communication device.

20. The communication controller of claim 19, wherein the electronic processor is configured to access, from a database, a user behavioral profile associated with the second portable communication device, and wherein the electronic processor detects the abnormal situation based on the user behavioral profile, and wherein the abnormal situation includes an increased transmission rate from the second portable communication device.

* * * * *